United States Patent [19]

Chalk et al.

[11] 4,108,942

[45] Aug. 22, 1978

[54] POLYPHENYLENE POLYMERS AND METHODS FOR MAKING THE SAME

[75] Inventors: Alan J. Chalk, Scotia; Alfred R. Gilbert, Schenectady, both of N.Y.

[73] Assignee: General Electric Company, Schenectady, N.Y.

[21] Appl. No.: 237,169

[22] Filed: Mar. 22, 1972

[51] Int. Cl.$^2$ .......................... C08F 4/66; C08F 38/00
[52] U.S. Cl. .................................... 260/875; 526/159; 526/285; 528/481
[58] Field of Search .......................... 260/88.2 D, 875; 526/159, 285

[56] References Cited

U.S. PATENT DOCUMENTS

| | | | |
|---|---|---|---|
| 3,066,119 | 11/1962 | Meriwether | 260/88.2 |
| 3,299,016 | 1/1967 | Sonnenfeld | 260/88.2 |
| 3,300,456 | 1/1967 | Hay | 260/88.2 |
| 3,322,803 | 5/1967 | Vohwinkel et al. | 526/144 |
| 3,705,131 | 12/1972 | Korshak et al. | 260/2 H |

FOREIGN PATENT DOCUMENTS 2,043,494  5/1971  Fed. Rep. of Germany.

OTHER PUBLICATIONS

Furlani et al., Polymer Letters, vol. 5, pp. 523–526 (1967).
Natta et al., Tetrahedron, vol. 8, pp. 86–100 (1960).
Korshak et al., Doklady Akademii Nauk SSSR, vol. 201, No. 1, pp. 112–114 (Nov. 1971).
Chemical Abstracts, vol. 70:4875g, p. 474, 1969, Semiconducting Organic Polymers.
Chemical Abstracts, vol. 75:37507v, p. 60, 1971, Polymeric Antifriction Material.

*Primary Examiner*—Edward J. Smith
*Attorney, Agent, or Firm*—Joseph T. Cohen; Charles T. Watts

[57] ABSTRACT

High temperature polymers are prepared by effecting reaction in the presence of an alkyl aluminum halide-titanium halide catalyst between a difunctional acetylene compound and a monofunctional acetylene compound. These polymers can be used for making composites with heat-resistant fibers, such as graphite fibers, glass fibers, etc., useful in airplane construction and in turbines.

3 Claims, No Drawings

POLYPHENYLENE POLYMERS AND METHODS FOR MAKING THE SAME

This invention is concerned with high temperature, polyphenylene polymers and methods for making the same. More particularly, the invention is concerned with a process for making polyphenylene polymers which comprises effecting reaction in the presence of a titanium-aluminum catalyst, conveniently expressed by the generic formula $TiCl_4/Al(C_2H_5)_2Cl$ catalyst (hereinafter referred to as "titanium catalyst") between (a) a monofunctional acetylene compound (hereinafter referred to as "monoacetylene compound") of the general formula

I R-C≡C-R' and (b) a difunctional acetylene compound (hereinafter referred to as "diacetylene compound") of the general formula

II R''(C≡CH)$_2$ where R is a member selected from the class consisting of hydrogen, $-C_6H_5$, $-C_6H_4CH_3$, and alkyl radicals of from 1 to 4 carbon atoms, R' is a member selected from the class consisting of hydrogen,

$C_6H_5C=C-$, $C_6H_5C≡C-$, $Z-C≡C-$, and

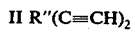
$Z-C=C-$ radicals, where Z is an alkyl radical of from 1 to 4 carbon atoms, and R'' is a divalent hydrocarbon radical selected from the class consisting of $-C_6H_4-$, $-C_6H_4-C_6H_4-$, and $-(CH_2)_m-$ radicals, where m is a whole number equal to from 1 to 5, inclusive. The invention also covers polymers made in accordance with the foregoing process.

Depending on the cotrimerization reactivity of the monoacetylene compound to the diacetylene compound, the molar ratios of these two starting ingredients can be varied fairly widely. However, in the formed polymer, the units derived from the monoacetylene compound should be in the molar ratio range of from 48 to 55 mol percent of the total recurring units derived from both the monoacetylene and the diacetylene compounds. As far as the starting acetylene compounds are concerned, if the diacetylene compound is less active than the monoacetylene compound, then the diacetylene compound can constitute the major molar proportion of the two acetylene compounds. Conversely if the diacetylene compound is more reactive than the monoacetylene compound, then the monoacetylene compound should constitute the major molar proportion of the two acetylene compounds. Keeping the reactivity of the two acetylenes in mind, one can thus advantageously employ as the starting acetylene compounds, from 0.9 to 1.2 mols of the monoacetylene compound for each mol of the diacetylene compounds.

It should be noted that the above requirement does not exclude the possibility of either (a) or (b) consisting of more than one acetylene, provided that the molar ratio of the combined monofunctional acetylenes to combined bifunctional acetylenes is in the above desired range in the polymer.

Monofunctional acetylenes, including phenylacetylene, have been polymerized in the past with transition metal catalysts, such as nickel chloride, in the presence of sodium borohydride [see Journal of Organic Chemistry 27, pages 1591-1596 and pages 3752-3756 (1962)]. However, these catalysts produce thermally unstable polyolefins rather than aromatic structures. When the aforesaid titanium catalyst is reacted with phenyl acetylene, one does not obtain any polymer but rather triphenyl benzenes are formed [see Polymer Letters 5, pages 523-526 (1967)]. We have found that the use of the titanium catalyst with the diacetylene compound alone produces insoluble polymer only.

Monoacetylene and diacetylene compounds have been copolymerized in the past using nickel carbonyl phosphine complexes [see Journal of Organic Chemistry 26, 5169-5175 (1961)]. However, under such conditions, one obtains primarily polyolefins rather than the more desirable heatresistant polyphenylenes.

We have now discovered that we can form high molecular weight polyphenylene polymers, i.e., polymers having molecular weights in excess of 5000, for instance, from about 8000 to as high as 50,000 to 100,000 molecular weight, by interacting a monoacetylene compound of formula I and a diacetylene compound of formula II, employing these two reactants in molar concentrations depending on the cotrimerization activity of the acetylenes, and carrying out the reaction in the presence of the aforementioned titanium catalyst.

Not only does the reaction to form the polymer go substantially to completion within a relatively short period of time, generally in the matter of less than an hour, but the temperatures at which these reactions can be carried out are often accomplished at below room temperature and even at temperatures as low as $-40°$ C. The polymeric product is about completely free of halogen, to within a few parts per million, despite the use of the titanium and aluminum halides. The polymer can be heated at elevated temperatures of about 200° to 500° C. to crosslink them and to form a tough, stable resin. Prior to any crosslinking of these polymers, the coreaction product is soluble in a number of common solvents such as benzene, toluene, etc.

The formation of these high molecular weight polymers by means of our invention was unexpected and could not have been predicted since such reactions are thought to be completely unselective (see C. W. Bird, Transition Metal Intermediates, page 19, Academic Press, New York, New York, 1967). Thus, one would expect that phenylacetylene and diethynylbenzene would give not only some polymer by cotrimerization, but also triphenylbenzene by the homotrimerization of phenylacetylene, together with insoluble cross-linked polymer resulting from the homotrimerization of diethynylbenzene. Surprisingly, we have found that under the conditions occuring in our invention, we can obtain highly soluble, high molecular weight polymers often approaching quantitative yields, even though it is believed that the catalyst is largely unselective and therefore yields a branched structure. It was unexpected to find that the bulk of the polymer was centered around a molecular weight of $10^4$ when measured by gel permeation chromotography (relative to polystyrene standards) and this value appeared to be usually invariant unless the withholding technique as applied to the monoacetylene compound was employed as described elsewhere in the specification. With this technique, the center of gravity of the molecular weight profile can be moved to a higher molecular weight range, generally of the order of from $5 \times 10^4$ to $10^5$.

Although the exact structure of the polymer is not known, it is believed that the polymer is predominantly branched because of its solubility and ease of processing, and is believed to consist of the following units:

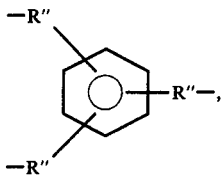

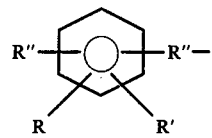

and

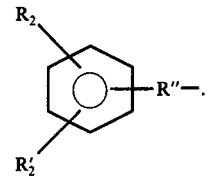

This highly branched structure is believed to be responsible for the high solubility of the polymers in benzene and chlorinated hydrocarbons in contrast to the relative insolubility of polyphenylene polymers made by other methods [see J. Macromol. Sci. (Chem.), Al, 183–197 (1967)].

What makes it possible to form a polyphenylene polymer rather than a polyolefin polymer is the use of a molar ratio of from 1.5 to 5 mols $Al(C_2H_5)_2Cl$ per mol $TiCl_4$; advantageously from 2.5 to 3.5 mols of the aluminum halide per mol $TiCl_4$ are employed. For most purposes, the catalyst is prepared in such a way that the titanium catalyst contains approximately three atoms of aluminum per atom of titanium. The best method for preparing the catalyst is an in situ preparation. This involves mixing the catalyst-forming reactants, in a common solvent, such as benzene, wherein the reactants are in a molar ratio of about one mol of titanium tetrachloride and three mols of aluminum diethyl chloride. Anhydrous conditions should be employed throughout; merely stirring the ingredients thoroughly at around room temperature or below is usually enough to prepare the catalyst for use in the above copolymerization reaction.

Among the monoacetylene compounds of formula I which may be employed in the practice of the present invention may be mentioned without limitation, for instance, acetylene, phenyl acetylene, tolyl acetylene (either the ortho, meta or para iosmers): propyne, butyne, hexyne (including all its isomers), where in the latter alkynes the unsaturation is terminal; and illustrative compounds of the formula

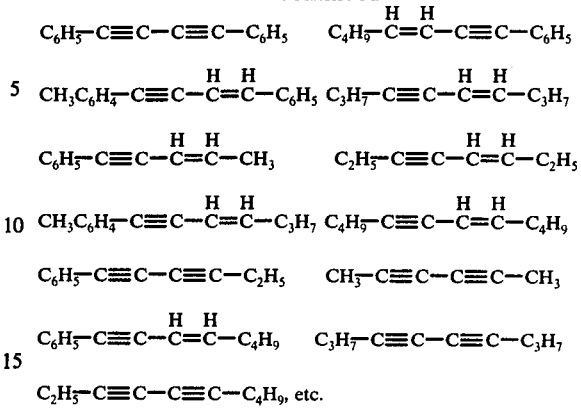

Among the diacetylene compounds corresponding to formula II which may be employed in the practice of the present invention may be mentioned, for instance, diethynyl benzene, specifically the meta and para isomers, 1,4-pentadiyne, 1,5-hexadiyne, 1,6-heptadiyne, 1,7-octadiyne, 4-methyl-1,6-heptadiyne, a biphenylene compound of the formula $HC{\equiv}C{-}C_6H_4{-}C_6H_4{-}C{\equiv}CH$ (including all its positional isomers), etc.

In carrying out the reaction to form the polyphenylene polymers, one preferred method comprises forming the titanium catalyst in situ as described above, and thereafter slowly adding the mixture of the monoacetylene compound and the diacetylene compound in the form of a solution in a common inert solvent, such as benzene or toluene while maintaining the temperature of the reaction mixture below room temperature and preferably from about $+10°$ to $-40°$ C. Good results have been obtained when the temperature is maintained within the more narrow range of $0°$ C. to $-20°$ C.

The reaction proceeds quite rapidly and ordinarily only a few minutes to at most one hour are required depending on the temperature of reaction, the type of ingredients and molar concentration of ingredients used, the concentration of the catalyst, etc. As far as the catalyst concentration is concerned, this can be varied quite broadly, the only condition being that a sufficient amount of the catalyst be used to effect the desired reaction. Generally the molar ratio of the mixture of acetylenes to titanium (in the catalyst) can range from 300:1 to 1500:1.

The reaction is carried out by dissolving the two acetylene compounds in a suitable solvent such as benzene, toluene, hexane, etc. Ordinarily, the solvent used should be unreactive to the catalyst and is usually a nonpolar solvent. The concentration of the reactants in the solvent added to the catalyst mixture is not critical but is generally employed in such concentration that it requires a minimum of solvent removal to obtain the desired polymer. Weight percents of the total mixture of the monoacetylene compound and diacetylene compound can advantageously range from about 10 to 40%, by weight, based on the total weight of the latter two ingredients and the solvent.

The polymers obtained in accordance with the practice of the present invention are soluble in nonpolar solvents such as benzene, toluene, etc. They can be isolated by the usual means of adding a nonsolvent (e.g., methanol, cyclohexane, etc.) to the polymer solution and precipitating the polymer. The isolated polymer, being thermoplastic, can be molded into various shapes.

Alternatively, solutions of the polymers can be applied to various substrates such as electrical conductors, heat-resistant cloths such as asbestos, carbon fibers, fiberglass (to make laminates), etc., and thereafter molded at elevated temperatures of the order of 150° to 300° C. to give heat-resistant products. Further heating of the molded or applied polymers at temperatures ranging from 200° C. to 500° C. causes conversion of the polymers to the cured state (i.e., the insoluble and infusible state) to a point where many of the polymers can withstand temperatures of about 400° to 500° C. for many hours without evidence of undesirable deterioration.

In order that those skilled in the art may better understand how the present invention may be practiced, the following examples are given by way of illustration and not by way of limitation. All parts are by weight unless otherwise indicated.

The titanium catalyst employed in the following examples can typically be prepared as follows: 7 ml. 15% diethyl aluminum chloride in hexane and 0.22 ml. titanium tetrachloride in 20 ml. benzene were mixed together while the ingredients were cooled in ice water. This gave the titanium catalyst which was used in situ form with the various acetylene compounds described in the following examples.

In the following examples, the term "diethynyl benzene" will be used to designate a mixture, on a weight basis, of 9 parts m-diethynyl benzene and 1 part p-diethynyl benzene.

EXAMPLE 1

A solution of 1.261 grams diethynyl benzene and 1.0209 grams phenylacetylene dissolved in 20 ml. dry benzene was added over a one-hour period to a stirred solution of the titanium catalyst described above, while the mixture was cooled in ice water so that the temperature of the reaction mixture was between 0° and 10° C. The reaction mixture was then allowed to warm up to 25° C. and stirred for 24 hours with stirring, after which an excess (over the catalyst) of a mixture of 50% concentrated hydrochloric acid and 50% methanol, on a volume basis, was added, followed by a large excess of methanol to precipitate the polymer. The polymer was isolated and dried to give a composition which could readily be molded.

EXAMPLE 2

Employing the same techniques as in Example 1, diethynyl benzene (I) was reacted with phenyl acetylene (II) or with m-ethynyl toluene (III) using the same titanium catalyst; in some instances, the catalyst concentration was varied or the molar ratios of the reactants were varied, and in another instance a nickel carbonyl phosphine catalyst was used. As an actual example of how this work was carried out, details of one test (No. 2) are recited as follows:

55 parts of diethynyl benzene and 45 parts phenyl acetylene were dissolved in 800 parts benzene and the solution was added over a period of one hour with stirring to a mixture of 8 parts $TiCl_4$, 16 parts $Al(C_2H_5)_2Cl$ (as a 15% solution in hexane) and 800 parts of benzene while the reaction mixture was maintained under a blanket of nitrogen. During the period of addition of the acetylene compounds, the temperature was maintained at about 0° C. The mixture was then allowed to warm to room temperature (about 27° C.) and then allowed to stir at this temperature for about 18 hours. An excess of hydrochloric acid (about 50 parts of concentrated acid) dissolved in an equal amount of methanol was then added to terminate the reaction and the polymer was then precipitated with excess methanol. The precipitated polymer was removed and dried at 100° C. in vacuum. The polymer was then dissolved in an excess of benzene to remove small amounts of insoluble materials, the latter removed by centrifuging, and the solution reprecipitated with methanol to give a 90% yield of the polymer having a molecular weight in the neighborhood of 10,000.

The following Table I, more concisely covering the tests involving the preparation of other polymers, shows the conditions of reaction, the catalysts and catalyst concentrations, the yields of polymer and the molecular weights of said polymers determined by gel permeation chromatography [as described in the book "Advances in Chromatography," Vol. 7, pages 3-46, edited by J. C. Giddings, R. A. Keller and Marcel Dekker (1968)]. Thermogravimetric analyses under nitrogen of some of the polymers of Test No. 2 are found in Table III (infra).

TABLE I

| Test No. | Molar Ratio of Reactants[1] | [4]Catalyst | % Yield Polymer | Molecular Weight |
|---|---|---|---|---|
| 1 | [2]I/II=1.0 | $Ni(CO_2)[P(C_6H_5)_3]_2$ | Gelled in air | — |
| 2 | I/II=1.0 | $TiCl_4/(C_2H_5)_2AlCl$ | 90 | $10^4$ |
| 3 | II only | " | Insoluble product | — |
| 4 | I/II=1.2 | " | [3]86 | $10^4$ |
| 5 | I/III=1.0 | " | 90 | $10^4$ |
| 6 | I/III=1.0 | " | 89 | $10^4$ |

[1]Concentration of reactants in benzene = 0.5 M.
[2]Carried out at reflux for 1 hour. Remaining tests performed as described above.
[3]About 5 to 10% insoluble product.
[4]In tests 2 to 5 the molar ratio of total acetylenes to titanium in catalyst was 300:1, and in test 6 the ratio was 500:1; in test 1, the molar ratio of the combined acetylenes to the nickel catalyst was 6000:1.

EXAMPLE 3

A mixture of 43 parts hexyne-1 and 57 parts diethynyl benzene in 100 parts toluene was added to a catalyst mixture made from 1.6 parts $TiCl_4$, 3.2 parts $Al(C_2H_5)_2Cl$ (in the form of a 15% solution in n-hexane) together with 500 parts toluene under a nitrogen blanket at −20° C. over a period of 10 minutes. After stirring for 3 hours at −20° C., the mixture was allowed to warm to room temperature and allowed to stir further for about 18 hours. The polymer was then worked up in the same manner as in Example 2 to give a yield of 93% polymer having a molecular weight of about 18,000. Thermogravimetric analysis in air at a temperature up to 400° C. (heating rate 10° C./min.) showed no weight loss of the polymer.

EXAMPLE 4

Example 2 was repeated with the exception that 48 parts of m-tolyl acetylene and 52 parts diethynyl benzene were used as reactants together with a catalyst made from 1.6 parts $TiCl_4$ and 3.2 parts $Al(C_2H_5)_2Cl$. An 89% yield of polymer was obtained having a molecular weight of about 10,000.

EXAMPLE 5

Acetylene gas was purified by passing it through first water, then concentrated sulfuric acid, then soda lime and finally through a trap at −80° C. This purified acetylene was then bubbled through a solution of 100 parts m-diethynyl benzene dissolved in 1000 parts toluene cooled to −40° C. under a blanket of nitrogen. While maintaining the acetylene flow (about 60 ml./min.), a catalyst solution was added [whereby the catalyst solution was made up of 1.6 parts TiCl$_4$ and 3.2 parts Al(C$_2$H$_5$)$_2$Cl in 100 parts toluene] over a 5 minute period. A vigorous exotherm resulted raising the temperature to −20° C. After further stirring for about 2 hours at −25° C., the mixture was allowed to warm to room temperature, and stirred for a period of about 18 hours. The polymer was then worked up in the same manner as was done in Example 2 to give about a 95% polymer yield based on the diethynyl benzene. The molecular weight of the polymer was approximately 11,000. A thermogravimetric analysis in air showed no significant loss in weight up to 500° C.

We have found that there are advantages in kind to be derived under some conditions in a two-stage reaction of the acetylene compounds. When the diacetylenes and acetylenes used have similar reactivity, an essentially equimolar mixture gives a polymer product having a broad molecular weight range, but the bulk of the material is centered around a molecular weight of about 10,000. Under some conditions, this molecular weight can be increased by a factor of 5 or more, by first adding to the catalyst mixture the bifunctional acetylene together with from about 25 to 75% of the monofunctional acetylene. By monitoring the disappearance of the two acetylenes by vapor phase chromatography, it has been found that after the bifunctional acetylene has disappeared to an extent approaching 90%, the remaining monoacetylene can be added to give the improved results. In this way completely soluble polymers of high molecular weight can be obtained. If, however, the addition of the remaining monofunctional acetylene is delayed too long, often insoluble polymers will result. If the two acetylenes are of different reactivity, it is important that the acetylene of lower reactivity (usually the monoacetylene compound) be in higher concentration in the first stage of the reaction by withholding a portion (up to about 75 weight percent) of the more reactive acetylene. The latter is then added to the reacting mixture sufficiently slowly so that the units corresponding to the two precursor acetylenes are in the polymer in approximately equal proportion.

The following examples illustrate different methods for employing the partial addition technique of attaining higher molecular weight polymers.

EXAMPLE 6

About 56.5 parts diethynyl benzene and 14.5 parts phenyl acetylene dissolved in 150 parts toluene were added to a mixture of 1 part Al(C$_2$H$_5$)$_2$Cl and 0.5 part TiCl$_4$ in 1500 parts toluene, while stirring the mixture under a blanket of nitrogen. The addition took place for about 7 minutes at about −20° C. Thereafter 29 parts of additional phenylene acetylene was added over a period of 17 minutes while again maintaining the temperature of the mixture at about −20° C. The mixture was then allowed to warm to room temperature and then stirred for an additional 18 hours. The mixture was treated with 5 parts concentrated (37.1% HCl) hydrochloric acid in 50 parts methanol, diluted with 250 parts toluene, and then precipitated with 12,500 parts methanol containing 50 parts concentrated hydrochloric acid. The polymer which was precipitated was filtered, washed in additional methanol (about 5000 parts) and dried in vacuum to yield a polymer in about a 95% yield having a molecular weight of about 60,000 establishing clearly the advantage of the later addition of part of the monoacetylene compound rather than adding the two acetylene compounds at one time.

EXAMPLE 7

About 52 parts p-diethynyl benzene and 18 parts m-tolyl acetylene dissolved in 300 parts toluene were added to 1.6 parts TiCl$_4$ and 3.2 parts Al(C$_2$H$_5$)$_2$Cl dissolved in 3200 parts toluene over a period of 2 minutes while the mixture was stirred under a blanket of nitrogen at a temperature of about −23° C. Thereafter the mixture was continued to be stirred for about 2 hours at −23° C., at which time an additional 30 parts of the tolyl acetylene together with 300 parts toluene was added over a 10 minute period. Again the stirring was continued for a further 2 hours at −23° C. The mixture was allowed to warm to room temperature and then permitted to stir for about 18 hours. The polymer was then worked up and isolated in a manner similarly as in Example 5. In this case, the polymer contained a considerable amount of insoluble gel due to the fact that the remaining portion of the monoacetylene compound, namely, the tolyl acetylene was added at a time too long after the initial reaction had taken place. The isolated polymer was then stirred for 2 hours with 50 times its volume of benzene, the insoluble material removed from the solution by centrifuging, and the polymer in the remaining solution precipitated with an excess of methanol and dried to give a yield of about 23% polymer of about 20,000 molecular weight.

EXAMPLE 8

36 parts diethynyl benzene was dissolved in 75 parts toluene (solution A) and 64 parts C$_6$H$_5$C≡C—C≡C—C$_6$H$_5$ were dissolved in 300 parts of toluene (solution B). Thereafter 0.8 part TiCl$_4$ and 1.6 parts Al(C$_2$H$_5$)$_2$Cl were diluted with 750 parts toluene under a blanket of nitrogen and cooled to −20° C. Solution B was added to this catalyst mixture over a period of 5 seconds while stirring vigorously and then ⅓ of solution A was added over a period of 5 minutes. After further stirring the mixture for 15 minutes, and after indication of no significant change in the concentration of the diethynyl benzene, the temperature was raised to 0° C. During the next 10 minutes, there was indication of a reaction which consumed most of the diethynyl benzene at which time the remainder of solution A was added over a period of 15 minutes. The mixture was then permitted to warm to room temperature and allowed to stir for about 18 hours. The polymer was then recovered in the manner similar to that described in Example 2, by precipitating it with acidic methanol, drying at 40° C. in vacuum and stirring it with 50 times its weight in toluene for about 2 hours. The small amount of insoluble gel which separated was removed by centrifuging. The solution was reprecipitated with excess methanol, filtered and dried. Whereas this polymer was soluble in toluene, heating the polymer at 240° C. for 5 minutes rendered it insoluble and infusible. Its good heat resistance was evidenced by the fact that it gave a thermogravimetric analysis which showed no significant weight loss below 400° C. in air.

EXAMPLE 9

A mixture of about 52 parts diethynyl benzene and 24 parts m-tolyl acetylene in 100 parts benzene was added to a catalyst mixture made from 1.6 parts TiCl$_4$ and 3.2 parts Al(C$_2$H$_5$)$_2$Cl in 4000 parts benzene over a period of 20 minutes at a temperature of about 0° C. During all this time, a blanket of nitrogen was maintained over the reaction mixture. While the reaction mixture was cooled with ice water, a further 25 parts of the tolyl acetylene together with 50 parts benzene was added over a period of 10 minutes and then the mixture was allowed to warm up to room temperature and then stirred for about 18 hours. The polymer was precipitated and isolated similarly as was done in Example 2. This gave a polymer in about a 72% yield having a molecular weight of about 50,000.

The following Table III shows the thermogravimetric analyses for some of the polymers prepared above, where the heating was conducted in a nitrogen atmosphere.

TABLE III

Thermogravimetric Analysis (TGA) Under Nitrogen

| Polymer Tested | 100–250° C. | 250–400° C. | 400–500° C. | 500–900° C. | Total Percent Weight Loss |
|---|---|---|---|---|---|
| [b]Example 2, Test 2 | 7.5 | 5 | 4 | 22 | 38.5 |
| [a,b]2A | 0 | 2.5 | 4 | 22 | 28.5 |
| [c]Example 7 | 0 | 0 | 4 | 20 | 24.0 |
| [c]Example 9 | 0 | 0 | 0 | 16 | 16.0 |

[a]Polymer 2A was obtained by reprecipitating the polymer from Example 2, Test No. 2 with methanol to remove some small amounts of low molecular weight products.
[b]Test carried out at rate of 2.5° C./min.
[c]Test carried out at rate of 10° C./min.

The following example shows the preparation of high temperature composites made from the polyphenyl composition described in Example 1 using two types of graphite fibers as reinforcing agents.

EXAMPLE 10

Commercially available fibers manufactured by Fibre Technology Institute (FTI) and by Modmor (Morganite) were heated at 800° C. under inert conditions to give constant surface properties. Fiber tows were then coated by threading them through a U-tube having a 1 inch radius bend and containing a 20–40% toluene solution of the polymer of Example 6. One end of the tube was restricted in diameter to remove excess polymer solution and to give the desired ratio of polymer to fiber. Individual tows were pulled through the solution at 5 inches per minute and then air dried. Several coated tows were combined and encased in a steel braided sheath which was drawn through a furnace having a nitrogen atmosphere. A weight was attached to the end of the sheath to provide lateral pressure to squeeze the coated tows together. This helped to decrease the void formation during the heating. The thermal treatment was varied by changing the temperature and time in the furnace. In general the heating of the cylindrical combination of tows was carried out at temperatures ranging from 400°–800° C. in nitrogen for times ranging from 2 to 15 minutes. The following table shows the tensile strengths of cylindrical carbon composites employing the two different carbon fibers.

TABLE IV

| Carbon Fiber | No. of Tows | Treatment Temp. (° C.) | Time (min.) | Tensile Strength psi |
|---|---|---|---|---|
| FTI (3000 fibers/tow) | 11 | 400 | 5 | 49,000 |
| | 10 | 500 | 5 | 80,000 |
| | 10 | 600 | 5 | 132,000 |
| | 60 | 800 | 2 | 60,000 |
| Morganite (10,000 fibers/tow) | 4 | 600 | 15 | [a]110,000 |
| | 8 | 600 | 15 | 75,000 |

[a]Average of three tests.

The polyphenylene compositions herein described, because of their properties of solubility in various solvents and their higher molecular weight, can be used in a number of applications, particularly where heat resistance is required. These polyphenylene polymers have advantages over a current commercially used polyphenylene composition known as "Abchar" sold by Hughes Aircraft Company, Culver City, California, and more particularly described in U.S. Pat. No. 3,595,811 issued July 27, 1971 as being made from the condensation of fused aromatic ring compounds. In contrast to our polymers being off-white, and thus color attractive, the Abchar resins are ordinarily brown-black in color. Also, the molecular weights of these Abchar resins are generally on the order of about 500 to about 4000, whereas the compositions of our invention have molecular weights ranging from 10,000 to as high as 50,000 or 60,000. What is even more significant is the fact that our polyphenylene compositions are soluble up to as much as 40%, on a weight/volume basis, in cold benzene for almost any known molecular weight. In contrast to this, the usual Abchar resins are stated to require chlorinated solvents boiling at 100°–200° C. to dissolve them at these elevated temperatures.

The compositions disclosed and claimed herein have many uses especially in high temperature applications. In general, they can be used in connection in making rocket nozzles, ablative materials, and other structures which are required to bear up under exceptionally high temperatures for long periods of time. One application may be to use these resins in combination with carbon fibers in the form of composites for turbine buckets revolving at high speed under possible abrasive conditions.

Because of their desirable electrical, physical, and chemical characteristics, the polymers can be fabricated into various shapes and form and will be found to retain their strength and good response to workloading at elevated temperatures for long periods of time. The polymers herein described can be dissolved in various non-polar solvents, such as benzene, toluene, chlorobenzene, etc. to make solutions which can be applied to various substrates for example, metals (such as copper, brass, aluminum, steel, etc.) the metals being in the form of sheets, fibers, wires, screening, etc.; glass in the form of sheets, fibers, films, fabrics, etc.; heat-resistant fabrics such as asbestos sheets, etc. In addition to using such coated substrates for protective means against elevated temperatures, such sheets can be superposed upon each other and then heated under elevated temperatures and pressure at about 200°–400° C. for times varying from about 10 to 30 minutes or more in order to fuse the polymer and to form homogeneous laminates which themselves have exceptionally good heat resistance.

The above-mentioned heat resistant products can be used for high temperature electrical insulation, protective coatings, filtration purposes, packing materials, brake linings, etc. They may be used also in electrical applications as insulation in motors, for slot liners and transformers, capacitor applications, cable wrappings, etc.

It will of course be apparent to those skilled in the art that in addition to the monoacetylenes and the dicetylenes used in the foregoing examples, other such acetylenes, many examples of which have been given above, in varying molar concentrations within the ranges recited above, can be employed without departing from the scope of the invention. In addition, the conditions can be varied widely keeping in mind that the desired properties of increased molecular weight and reduced periods of reaction time are highly desirable attributes of our process for making these polymers.

What we claim as new and desire to secure by Letters Patent of the United States is:

1. The process for making polyphenylene polymers which comprises polymerizing, in the presence of a titaniumaluminum catalyst of the formula $TiCl_4/Al(C_2H_5)_2Cl$ made by the reaction of $Al(C_2H_5)_2Cl$ and $TiCl_4$ in a molar ratio of from 1.5 to 5 mols of the $Al(C_2H_5)_2Cl$ per mol of the $TiCl_4$, (a) a phenyl acetylene compound selected from the class consisting of phenyl acetylene and m-tolyl acetylene and (b) diethynyl benzene, whereby from 25 to 75% by weight of the phenyl acetylene compound is first interacted with the diethynyl benzene in the presence of the titanium-aluminum catalyst, and the remainder of the phenyl acetylene compound is added after the aforesaid initial reaction.

2. The process as in claim 1 wherein the phenyl acetylene compound is phenyl acetylene.

3. The process as in claim 1 wherein the phenyl acetylene compound is m-tolyl acetylene.

* * * * *